US007421325B2

(12) United States Patent
Geist et al.

(10) Patent No.: US 7,421,325 B2
(45) Date of Patent: Sep. 2, 2008

(54) AUTOMATIC TRANSMISSION CALIBRATION METHOD

(75) Inventors: Bruce Geist, Sterling Heights, MI (US); Pradeep Attibele, Ann Arbor, MI (US); Javed Dada, Lapeer, MI (US); John M Rzepecki, II, Clinton Township, MI (US); Alexander Dolpp, Auburn Hills, MI (US); David Parenti, Waterford, MI (US); William F Resh, E. Lansing, MI (US)

(73) Assignee: Chrysler LLC, Auburn Hills, MI (US)

( * ) Notice: Subject to any disclaimer, the term of this patent is extended or adjusted under 35 U.S.C. 154(b) by 602 days.

(21) Appl. No.: 11/097,650

(22) Filed: Apr. 1, 2005

(65) Prior Publication Data

US 2006/0224291 A1    Oct. 5, 2006

(51) Int. Cl.
*G06F 7/00*    (2006.01)

(52) U.S. Cl. .............................. 701/51; 701/54; 477/15

(58) Field of Classification Search ............. 701/51–55; 477/15, 34, 77
See application file for complete search history.

(56) References Cited

U.S. PATENT DOCUMENTS

| 4,774,858 | A | * | 10/1988 | Ganoung | ..................... 477/32 |
| 4,799,158 | A | | 1/1989 | Patil | |
| 4,935,872 | A | | 6/1990 | Benford et al. | |
| 4,936,167 | A | | 6/1990 | Mehta | |
| 4,964,318 | A | * | 10/1990 | Ganoung | ..................... 477/110 |
| 4,982,620 | A | | 1/1991 | Holbrook et al. | |

* cited by examiner

*Primary Examiner*—Gertrude Arthur Jeangla
(74) *Attorney, Agent, or Firm*—Ralph E. Smith

(57) ABSTRACT

Automated calibration of an automatic transmission design generates upshift scheduling curves in a throttle level/transmission output speed plane based upon laboratory-generated data and user generated drivability data. Downshift scheduling curves and torque converter lock-up and unlock curves are then generated as offsets from breakpoints on corresponding upshift curves, the offsets determined principally from the drivability data.

10 Claims, 6 Drawing Sheets

AUTOMATIC TRANSMISSION CALIBRATION METHOD

BACKGROUND OF THE INVENTION

The invention generally concerns a method for calibrating an automated transmission. More specifically, the invention is directed to an automated method for scheduling shifts and torque converter lock-up in an automatic transmission.

Conventional transmission shift scheduling for a new vehicle design has required the existence of at least a prototype vehicle of the new design and a labor intensive manual calibration process requiring typically weeks of effort. There is a need in the art for an automated calibration method for generating at least initial transmission gear shift and torque converter lock-up schedules not requiring use of an actual vehicle.

SUMMARY OF THE INVENTION

Accordingly, a method of calibrating an automatic transmission for a vehicle design acquires laboratory-generated vehicle engine and transmission data, acquires user-generated drivability data, determines upshift throttle levels from the acquired laboratory-generated data and from the drivability data, determines target engine speeds before upshift throttle levels from the laboratory-generated data and the drivability data, and generates upshift scheduling curves in a throttle level/transmission output speed plane based upon the determined target engine speeds.

In a further aspect of the invention, the method additionally generates downshift scheduling curves from generated upshift scheduling curves by calculating throttle and speed offsets from breakpoints on a corresponding upshift scheduling curve, the offsets based on the drivability data.

In yet another aspect of the invention, the method additionally generates torque converter lock-up scheduling curves from generated upshift scheduling curves by selecting transmission output speed offsets from breakpoints on corresponding upshift scheduling curves, the offsets based on the drivability data.

In still a further aspect of the invention, the method additionally generates torque converter unlock scheduling curves from corresponding generated upshift scheduling curves and downshift scheduling curves by positioning breakpoints of an unlock scheduling curve between breakpoints on corresponding upshift and downshift scheduling curves at positions determined from the drivability data.

BRIEF DESCRIPTION OF THE DRAWING

The objects and features of the invention will become apparent from a reading of the detailed description, taken in conjunction with the drawing in which.

DETAILED DESCRIPTION

This invention assists calibration engineers in the task of quickly generating a perfected transmission calibration. The method of the invention takes as input engine dynamometer data and transmission data and produces an initial shift and lock-up schedule for a vehicle's automatic transmission.

Figure 3:
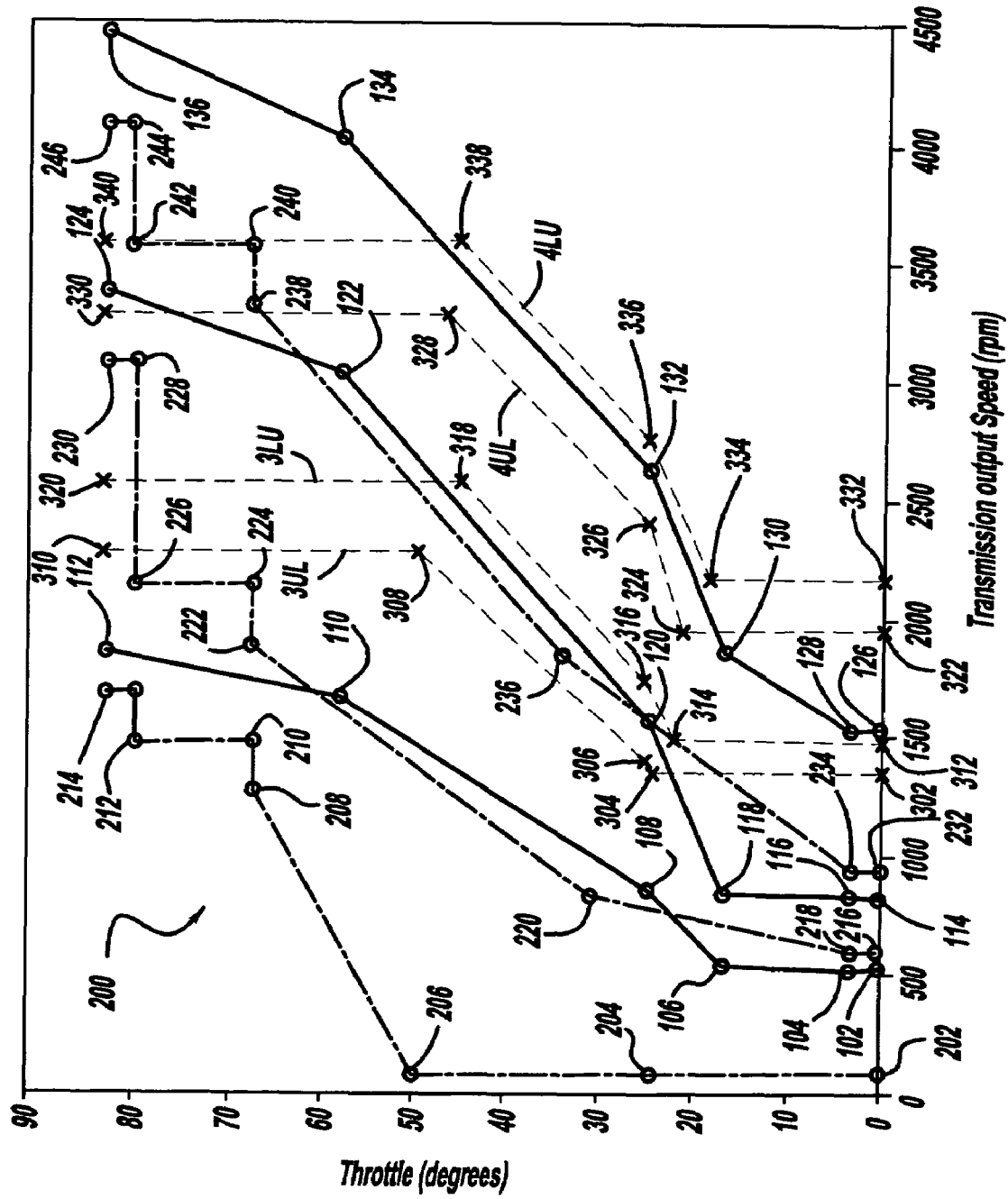
FIG. 3 depicts torque converter lock and unlock curves added to the curves of FIG. 2 and generated in accordance with the principles of the invention.

FIG. 3 shows an example shift schedule for a four-speed vehicle for which earliest lock-up occurs in third gear. The horizontal axis in the plot shown is transmission output speed, which is a scaled version of vehicle speed. The vertical axis is a driver intent variable. This parameter typically depends exclusively on driver accelerator pedal angle and reflects the driver's expectation for acceleration intensity. In manual throttle vehicles, this variable typically has been throttle degrees. In electronic throttle control vehicles, this variable is typically given as a percent of maximum pedal travel.

As an illustration of how the schedule controls the gear choice for the vehicle, suppose a driver accelerates a stopped vehicle by depressing the pedal to 30% of maximum. As the transmission output speed increases during vehicle acceleration, the vehicle operating point will eventually approach the 1-2 upshift curve of FIG. 1 from the left. As it passes the 1-2 curve, the vehicle will upshift to second gear. Similarly, as the transmission output speed increases and the operating point passes the 2-3 upshift line of FIG. 1, the vehicle will upshift to third gear. While in third gear, if the vehicle operating point crosses the 3-4 upshift line, the vehicle will upshift to fourth gear.

Suppose that just after the vehicle upshifts to second gear at 30% pedal, the driver depresses the accelerator pedal to 85% of maximum. Referring to FIG. 2, the vehicle operating point will, as the pedal is depressed and pedal percent moves toward 85%, cross the 3-2 downshift curve. But because the vehicle is not in gear three, crossing this curve has no effect. However, as the operating point crosses the 2-1 downshift curve, a 2-1 gear kickdown occurs. Crossing a downshift or upshift curve causes a shift only if the vehicle is in an appropriate gear. For example, crossing the 2-3 upshift curve has an effect on vehicle gear only if, as the operating point crosses this curve, the vehicle is in second gear. Similarly, a 3-2 downshift crossing will cause a kickdown in gear only if the vehicle is in third gear. More generally, a curve that takes a vehicle from gear X to gear Y is labeled X-Y in FIGS. 1-3. When the vehicle operating point crosses curve X-Y, a shift event occurs only when the vehicle was in gear X when it crossed the line.

The fourth gear lock-up line is labeled 4LU in FIG. 3. The third gear lock-up line is labeled 3LU. As the operating point crosses 3LU while in third gear, a lock-up event may be triggered. Crossing this line enables the event, though other conditions must typically be met in addition before a torque converter lock-up actually occurs. Furthermore, the type of lock-up event (partial or full) depends on other parameters. Similarly, if the vehicle is in fourth gear and the torque converter is unlocked, and the operating point crosses the 4LU curve, then a converter lock-up event is enabled, though may not actually occur unless other conditions are met. When the vehicle torque converter is locked up in fourth gear, and the pedal is increased so that the operating point crosses the 4UL curve, then the torque converter will unlock. When the vehicle is locked up in third gear and the pedal is increased so that the operating point crosses 3UL, then the vehicle torque converter will unlock.

A vehicle's driving "feel" is dramatically influenced by the shift and lock-up schedules programmed into the vehicle's electronic control unit. Delaying shifts too long can make a vehicle feel as though it is straining to achieve acceleration. Upshifting too early can produce a disconcerting feeling that the vehicle is malfunctioning and/or is under powered. Torque converter lock and unlock events, when poorly timed, can produce a feeling that the vehicle is unresponsive. Delaying the downshift event too long after a driver begins pushing the accelerator pedal, or scheduling it at too early a pedal angle will likely be perceived negatively. In the first case, the driver may believe that the engine lacks power, and in the second case, the driver may perceive that shifting is too volatile or "busy". On the other hand, well timed upshifts, downshifts, lock and unlock events can enhance the feel of a vehicle. Well timed transmission and converter events produce smooth accelerations, graduated in intensity according to accelerator pedal position. A good calibration enhances the driving experience.

The method of the invention places highest priority on producing a good feeling shift schedule—that is, one that is said to have good "drivability". In essence, drivability objectives impose constraints that define regions in the transmission output speed versus pedal percent plane where upshift, downshift, lock and unlock curves should be defined. Drivability is subjective, and its definition will to some extent vary from one person to the next. Therefore, the invention generates calibrations that produce a good initial "draft" calibration which most drivers would find acceptable.

A shift schedule with good drivability will obtain better fuel economy whenever the shift schedule selects an operating state that meets drivability constraints and reduces engine speed. Therefore, in designing a shift schedule, those schedules that tend to reduce engine speed when delivering the required torque-to-the-ground at the prescribed vehicle speeds will induce better fuel economy in the vehicle. This typically means a schedule will be more fuel economic if it causes upshifts at earlier speeds and torque converter lock-up as soon after upshift as possible.

For any given reasonable shift and lock-up schedule, it is relatively straight forward to determine a more fuel economic schedule. Simply change the schedule to cause engine speeds to move lower. This really means that the upshift and downshift curves and companion lock-up curves tend to approach lower and lower transmission output speeds, so that the vehicle obtains a high, locked-up gear as soon as possible. Fuel economy enhancement also occurs when unlock curves move in such a way that converter unlock events get progressively more unlikely. Since drivability is highly subjective, drawing firm boundaries, especially in a virtual setting where no actual vehicle may yet exist is probably not feasible. On the other hand, producing a schedule that, based on experience with other vehicle schedules, will have good drivability, but that is not necessarily at the limits of what is drivable (and hence a schedule that will not produce the absolute best fuel economy), certainly is possible. This is what the inventive method aims to accomplish—produce a shift and lock-up schedule with good drivability first and fuel conservation second where possible.

A shift schedule determines gear and lock-up state given a vehicle state defined by transmission output speed and throttle degrees or pedal percent. This input, whether it is throttle angle or pedal percent, is directly controlled by the driver accelerator pedal. Assume that pedal position is the second input variable to the shift schedule.

Pedal is directly controlled by the driver of the vehicle and hence is used to assess driver intent. Higher pedal is interpreted as a request for increased acceleration. A goal is to produce a schedule that offers smooth accelerations of higher and higher intensity as pedal is increased. Thus, the accelerator pedal position is abstracted by the method of the invention as an acceleration, or torque-to-the-ground request. Other drivability objectives and general principles given below lead to specific schedule construction techniques that are discussed later herein.

Drivability principles taken into consideration by the invention are:

Higher pedal values imply the driver expects higher intensity vehicle acceleration;

During constant pedal acceleration, the engine should not stay in any one gear a disproportionate amount of time. This means for a fixed pedal/throttle position, engine speeds just before upshift events should be approximately the same;

Maximize vehicle acceleration during wide open throttle (WOT) operation;

Reduce shift busyness by allowing an unlock event before a downshift as pedal is increased;

Minimize dead-pedal feel;

Minimize noise, vibration and harshness (NVH) especially during low pedal operation. Smooth, low NVH acceleration is most important at low pedal, and is more important than performance in the low pedal region;

Insure that any kick-down event does not occur unless the vehicle will stay in the kicked down gear for at least one second;

Avoid the feeling of hanging in gear. When there is only minimal acceleration benefit obtained by staying in gear longer, consider upshifting to higher gear to avoid the driver perception that the vehicle is straining to accelerate, particularly germane to mere WOT operation.

There are two types of input data used by the method of the invention: lab generated data and drivability target data. The lab generated data consists of basic engine and transmission parameters as well as two dynamometer generated data sets. The drivability target data specify things such as the earliest possible turbine speeds for locking the converter. Drivability data also helps specify a calibration preference for sporty feel versus fuel economy.

The basic vehicle and engine parameters required are:

engine displacement (in liters);

estimated road load ABC's; These values specify the decelerating forces on a vehicle as a function of vehicle speed v in miles per hour. $A+Bv+Cv^2=R$, where R is a deceleration force expressed in units of pounds;

number of forward gears and all gear ratios;

final drive radio;

vehicle weight (in pounds); and tire size (in revolutions per mile).

Two text files are constructed for input to the method of the invention. One file specifies the engine pedal map, and the other file specifies torque converter performance.

The engine pedal map input file contains three columns of data: engine speed (rpm), BMEP (brake mean effective pressure in pounds per square inch), and pedal or throttle (or other driver intent variable in units of percent). Other requirements for this data are as follows:

1. There should be no fewer than eight engine speeds represented.
2. The lowest engine speed group average should be below the lowest engine speed expected after an upshift event. For a four cylinder engine this typically means the lowest engine speed should be about 1200 rpm. For an eight cylinder engine, engine speeds after an upshift can and should be lower, so the lowest engine speed represented in the data file should be about 800 rpm. A six cylinder engine may require only that engine speeds begin at 1000 rpm.

3. The highest engine speed should correspond to fuel cut-off. This is typically near 6000 rpm and can range from 5500 to 6500 rpm or higher.
4. For each engine speed there should be no fewer than five throttle/pedal values (eight or more preferred), distributed evenly from the lowest reasonable pedal operation at the given engine speed up to and including 100% pedal or throttle.
5. The maximum engine speed in the data file should be higher than 4500 rpm.

A second input text file is required that specifies torque converter performance. The file should be composed of three columns representing torque converter speed radio, K-factor, and torque ratio. Additional requirements for this data are:

1. The speed ratio column should begin with a value 0 in row one and strictly increase to a final speed radio of 1 in the last row of the data file.
2. Typically, the dynamometer data will only record converter performance at speed ratios up to about 0.95. Theoretically, the K-factor at speed ratio 1 should be infinite, and the torque ratio should approach a constant value just less than 1 as the speed ratio increases to 1. Since the method requires a data point at speed ratio 1, the user must add a final row to the dynamometer data of 1, 1e20, t, where t is replaced by the final torque ratio specified within the dynamometer data associated with the speed ratio closest to 1 (typically 0.95 or slightly smaller).
3. While there is no restriction on the number of rows of data specifying converter performance, it is typically desirable to have at least 15 or more rows of data more or less evenly distributed between 0 and 1.
4. Typically, converter performance varies slightly depending on the external load that is maintained when gathering the data. Generally speaking, converter data determined using 100 or 200 ft./lbs. of brake torque is acceptable, but light load converter data (recovered using 50 or 80 ft./lbs. of brake torque) is preferable. The method of the invention uses converter data to estimate slip especially at light engine loads.

A second type of input parameters come from the user. This set of parameters helps assess drivability requirements and NVH related constraints. These inputs can be categorized naturally into three groups: engine related, schedule drivability related, and torque converter related drivability and NVH parameters.

There are three engine NVH and drivability parameters:
1. Target engine speed variance for upshifts, which defines a permissible variance and upshift engine speed target selection. The exact manner in which this parameter is utilized in target engine speed selection will be described in a later section.
2. MESAU: minimum engine speed after an upshift event. Every upshift event must occur at a high enough engine speed that post upshift engine speeds do not sink too low. MESAU figures prominently in selecting target engine speeds, since in no case should a target engine speed before upshift cause engine speeds after an upshift to be below this threshold. The manner in which the torque converter and engine combination function together largely dictates how this parameter should be set.
3. Maximum engine speed. Maximum engine speed is an upper bound on engine speed during regular vehicle operation. This parameter should be set to the highest possible dynamometer engine speed gathered, which is typically the speed at which control software will shut off fuel to the engine (fuel cut-off speed).

There are four types of schedule drivability parameters:
1. Pedal levels defining lowest, low, medium and high pedal ranges.
2. Values for low and mid-pedal. These values assist in determining how aggressively the method schedules upshifts. Values near 1 cause the vehicle to stay in lower gear longer, so that engine speeds get higher to achieve higher acceleration. Values near 0 cause upshift events to occur at lower engine speeds for better NVH performance and economy of fuel consumption.
3. Suggested coast down vehicle speeds. The user suggests a sensible vehicle speed for a low pedal downshift. This speed is honored, provided it meets drivability requirements. Otherwise, the method attempts to get as close to this speed as possible without violating drivability requirements.
4. Engine speeds at wide open pedal upshifts. The method will determine reasonable defaults based on past vehicle data and based on fuel cut-off engine speed. However, these defaults may be discarded in favor of user selected upshift engine speeds during WOT operation.

Torque converter related input parameters (in addition to the dynamometer data discussed earlier) are, as follows:
1. Earliest gear lock-up declaration. This specifies the earliest target gear for lock-up.
2. Converter unlock control. A value near 0.2 is typical. Less than 0.2 makes unlock more likely, greater than 0.2 makes unlock less likely.
3. Delay (in transmission output speed units) after upshift to lock-up. The smaller this number is, the earlier that lock-up can occur after upshifts, which saves fuel. However, earlier lock-up can cause NVH issues. A default value of 150 rpm for this parameter appears to provide good drivability based on experience.
4. Lock-up and unlock turbine speed thresholds. For each gear, three thresholds are defined. One threshold indicates the lowest turbine speed at which partial lock-up can begin. A second threshold indicates the lowest turbine speed at which full lock-up can begin. For each of these parameters, there are (typically smaller) companion parameters which indicate at what turbine speed the transmission must exit a partial lock-up state or exit a full lock-up state. For an entirely new vehicle, the user should use turbine speeds from a similar vehicle as a guide for setting these parameters for generating a schedule with the method of the invention. All of these numbers define a legal range where the converter may operate. The lock-up and unlock schedules generated by the method of the invention indicate specifically where, within the legal range defined by these parameters, the lock and unlock events may occur.

Figure 1:
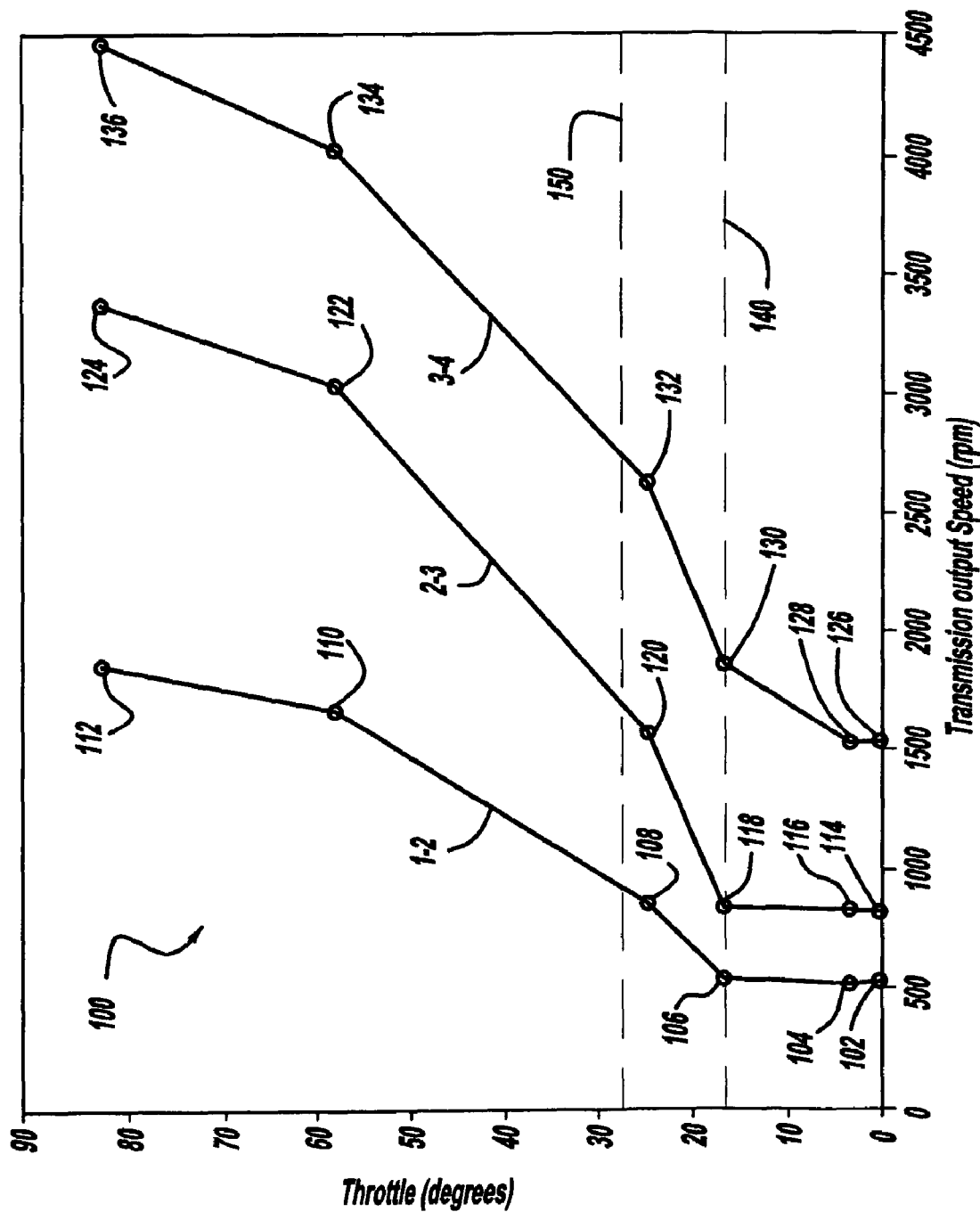
FIG. 1 depicts transmission upshift curves generated in accordance with the principles of the invention.
Figure 2:
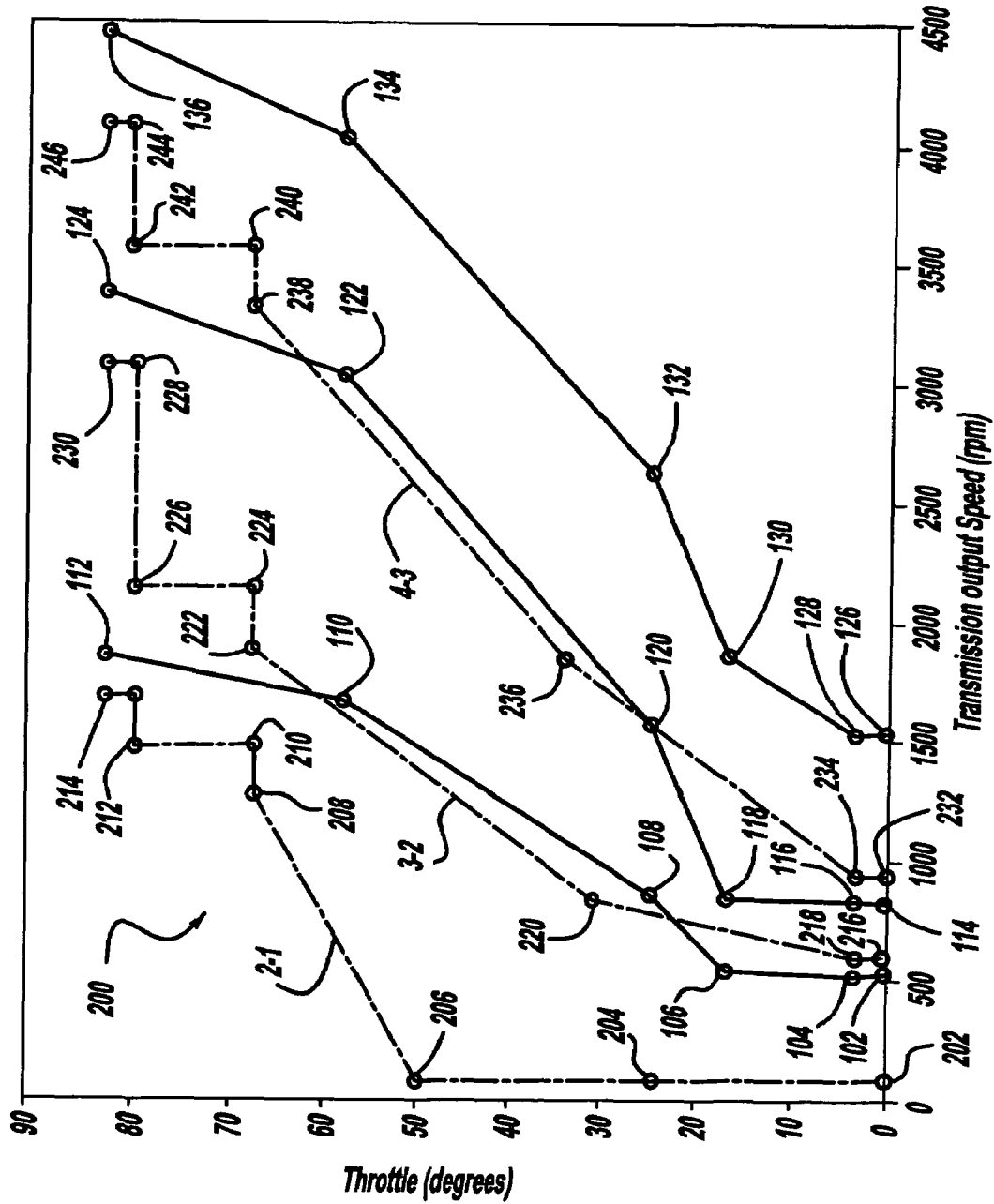
FIG. 2 depicts transmission downshift curves added to the upshift curves of FIG. 1 and generated in accordance with the principles of the invention.

Three algorithms are central to most if not all breakpoint determinations of the invention, these breakpoints being graphically illustrated in the schedules of FIGS. 1-3.

The first algorithm determines transmission output speed from engine speed, pedal position, transmission gear ratio, and torque converter data. The torque converter input data file provides sufficient data to construct a converter's K-factor curve as a function of slip. A quadratic shape preserving interpolating spline is used to create a differentiable function $k(s)$. This particular type of spline is a good choice because it follows the data better than a cubic spline does. Of course $k(s_i)=k_i$, that is when k is evaluated at a speed ratio from the data set, its value is equal to the corresponding K-factor from the data set. Furthermore, when the data $k_i$ are decreasing, the spline decreases; when the $k_i$ increases, the spline increases. Concavity of the data is also matched by the concavity of the spline.

Let $\vec{k}$ be the K-factor column vector from the input file, and let $\vec{s}$ be the corresponding column of slip, $\vec{s}$. Let k(s) be a spline interpolating the K-factor curve data ($\vec{s}$, $\vec{k}$), creating a K-factor function of speed ratio s. The following equation relates engine speed and torque to the speed ratio s. In effect the following equation implicitly defines s as a function of engine speed E and pedal h. Suppose q(E,h) represents engine torque in units of ft-lbs when the pedal (or throttle) is h. Then speed ratio s(E,h) corresponding to engine speed E (expressed in units of rpm) and pedal h is defined by $$\frac{E}{\sqrt{q(E, h)}} - k(s) = 0. \tag{1}$$

It is possible that two speed ratios satisfy the above equation. This can happen when the K-factor curve is not a strictly increasing function of speed ratio s. For modeling purposes, the method of the invention always determines the largest speed ratio that satisfies equation (1), and uses this result to define s(E,h). Furthermore, there may be no solution to equation (1) for very low engine speeds. In this case, the speed ratio that minimizes k is defined as s(E,h).

Once s(E,h) is known, transmission output speed can be calculated by $$t(E, h; g) = \frac{s(E, h) \cdot E}{g} \tag{2}$$

The second algorithm estimates vehicle acceleration due to engine torque as a function of engine speed. Before applying equation (3) below, the parameters involved are converted to SI units. Then, vehicle acceleration is computed as a function of engine speed, where the last engine speed for which acceleration is computed corresponds to the last good engine speed provided in the engine torque data file.

$$a(E, h) = \frac{q(E, h) \cdot f \cdot g \cdot \tau(s(E, h))}{r \cdot m} \tag{3}$$

In this equation, q(E,h) is engine torque for engine speed E and throttle or pedal percent h. The function q(E,h) is a polynomial spline generated from dynamometer data. Parameter $f$ is the vehicle final drive ratio, g is the first gear ratio, r is the tire radius (calculated from a tire size input parameter), and m is the vehicle mass. The value $\tau(s(E,h))$ is the torque converter torque ratio corresponding to the speed ratio s(E,h). The torque ratio $\tau(s(E,h))$, is determined by evaluating a quadratic spline created from torque ratio input data at speed ratio s(E,h).

Let w be tire size in units of revolutions/mile, and suppose $f$ is the final drive ratio for the vehicle. To determine vehicle speed from transmission output speed t, multiply transmission output speed as calculated in equation (2) by 60/($f \cdot w$), to find an estimate for vehicle speed in miles per hour:

$$v(E, h) = \frac{t \cdot 60}{f \cdot w}. \tag{4}$$

The calculation in equation (3) does not include any losses that will affect vehicle acceleration, such as aerodynamic drag or frictional gear train losses. In calculations that require such loss estimates, the loss coefficients (often called the vehicle A,B,C's) can be used to estimate vehicle deceleration as a function of vehicle speed. The coefficients A, B, and C are determined such that a decelerating force F in pounds is approximated as a function of vehicle speed in units of miles per hour v as $$F = A + Bv + Cv^2. \tag{5}$$

Figure 4:
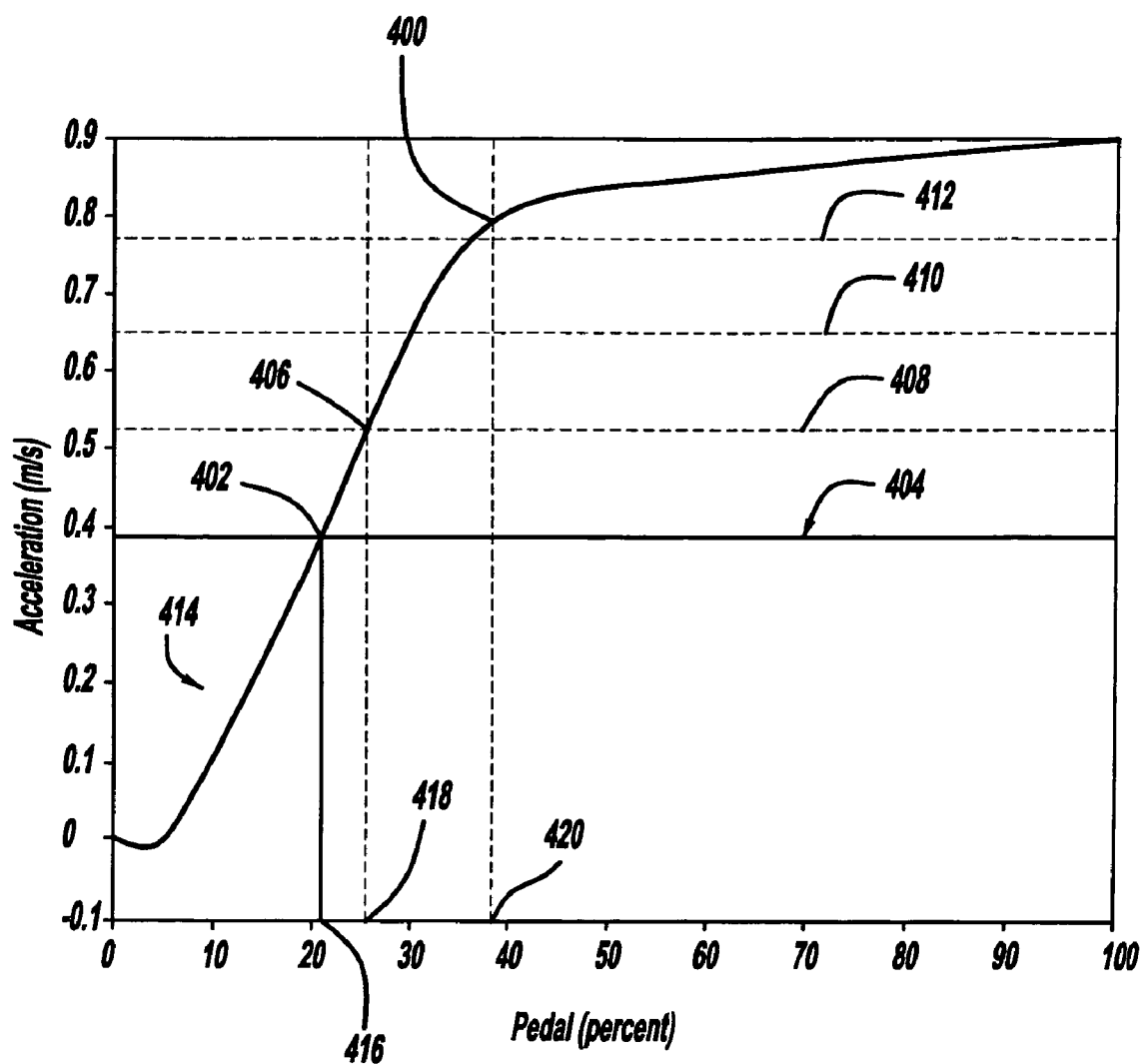
FIG. 4 is a graph of vehicle acceleration versus accelerator pedal travel used in determining a light pedal boundary in accordance with the invention.
Figure 5:
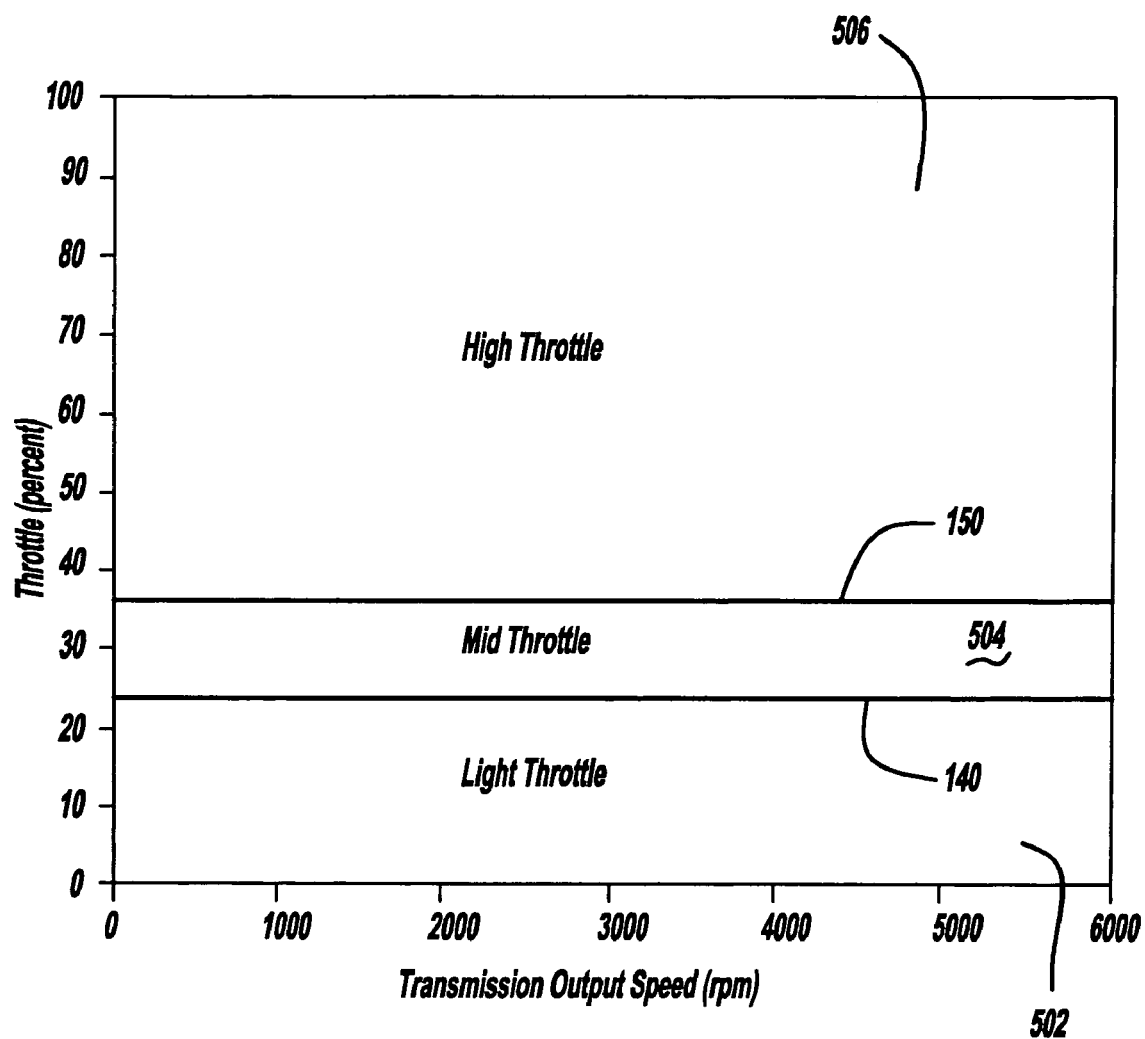
FIG. 5 is a graph identifying throttle regions for a vehicle design whose transmission is being calibrated.

The third algorithm uses input vehicle data to determine two fundamental pedal levels: the light pedal boundary 140 of FIG. 1 or FIG. 5 and the middle pedal boundary 150 of FIG. 1 or FIG. 5. The driver expects vehicle acceleration to become more intense as driver pedal angle is increased. For gasoline engines it is not possible to rely solely on engine torque to deliver extra acceleration as a driver depresses the accelerator pedal. Typical gasoline engines produce very little added torque for changes in pedal angle after pedal values have reached 40 or 50% of maximum, as shown by the graph of FIG. 4. This is because torque delivered by the engine depends on air flow through the throttle. After 30 to 50 degrees rotation of the butterfly valve on a throttle body, air flow (and hence engine output torque) does not appreciably increase for additional rotation of the throttle valve. Determining where in the throttle/pedal range this "choke" point 400 of FIG. 5 occurs is important in determining a shift schedule. The strategy for delivering ever more intense acceleration must move away from a reliance on added engine torque for higher pedal, toward a strategy of staying in gear longer and longer. This is because after the choke throttle level 400, the engine does not deliver much added torque. Therefore, the only way to provide higher intensity acceleration is to delay the upshift. Therefore, locating the choke pedal or throttle value 400 indicates where a transition in acceleration strategy must take place. Ultimately at WOT the maximum intensity acceleration is delivered to the driver by keeping the car in gear for as long as possible. At WOT, acceleration curves from one gear to the next typically do not cross—i.e., at full throttle, it is not advantageous to move to the next gear earlier than when the engine reaches the highest engine speed that power train or drivability constraints will allow. Part throttle operation is a different story. For low and medium pedals, vehicle acceleration curves typically do cross—e.g., it can happen that at 20% pedal, the vehicle acceleration at a certain vehicle speed in gear one is inferior to the acceleration in gear two at the same speed.

The light pedal boundary 140 of FIG. 5 is a second critical pedal level identified prior to creating a shift and lock-up schedule. During light pedal/throttle operation, a driver expects smooth, fuel efficient performance. Therefore, in this pedal region, engine speeds are intentionally kept low by upshifting as soon as feasible given the constraints of NVH and other drivability rules. Empirical testing has led to defining the highest light throttle/pedal value in terms of a torque (or acceleration) reserve concept. The light pedal region is determined as follows. For a typical light pedal engine speed of 2200 rpm, the corresponding vehicle speed is determined when the transmission gear ratio is 1.0 (typically in third or fourth gear) and the torque converter is locked. Using this vehicle speed, a "road load" deceleration force is calculated using equation (5) above. This deceleration force is scaled by the mass of the vehicle. The resulting deceleration is plotted at 404 of FIG. 4 alongside the estimated vehicle acceleration calculated by using equation (3) above. The region between the road line 404 and the maximum vehicle acceleration at 100% throttle is divided into four quadrants by the dotted lines 408, 410 and 412 of FIG. 4. The light throttle/pedal boundary 418 is defined as that throttle/pedal value $h_0$ that corresponds to achieving 25% of the total vehicle acceleration at point 406. FIG. 4 shows a vehicle for which $h_0$ at point 418 is approximately 24%.

Light pedal is defined as pedal values that correspond to less than 25% of the available acceleration reserve of the vehicle when the converter is locked, the transmission gear ratio is 1.0, and engine speed is approximately 2200 rpm. The lightest pedal level, intended to be well underneath the light pedal boundary, is chosen as that pedal level 416 of FIG. 4 required to produce enough engine torque to overcome road load at a vehicle speed of 25 mph when the gear ratio is 1.0 and the torque converter is locked. The lightest pedal level indicates where the engine performance is sufficient to just barely overcome road-load forces at low vehicle speeds in lower gears.

Each upshift curve 1-2, 2-3 and 3-4 of FIGS. 1-3 generated by the method of the invention is composed of six points in a coordinate plane in which the X axis represents transmission output speed and the Y axis represents pedal percent. Breakpoints that form the upshift curves, defined as piecewise linear curves, in the output speed/pedal plane are chosen as follows.

A WOT upshift event is targeted to occur at the highest practical engine speed. This is because at maximum pedal the driver wants maximum acceleration. For most vehicles, maximum acceleration is attained by staying in gear as long as possible. For non-overdrive gear ratios, maximum engine speed in lower gears is typically 95% of the fuel cut-off engine speed. The last upshift is earlier to avoid producing a vehicle that seems to "hang" in gear. These WOT engine upshift speeds are calculated for the 1-2, 2-3 and 3-4 upshifts based on the fuel cut-off speed provided by the user. The lower upshifts occur when engine speed is 95% of fuel cut-off. If the engine speed were allowed to move higher than this, some powertrains might be damaged. The last upshift occurs at 85% of fuel cut-off engine speed. The last upshift is targeted to occur at 85% of fuel cut-off—earlier than the other WOT upshifts—because the marginal gain in acceleration for staying in gear longer is outweighed by the need to avoid a driver impression that the vehicle is straining in gear. Therefore, the final upshift occurs at an earlier engine speed than for the other upshift curves. All the default WOT engine upshift speeds can be overridden in favor of user selected WOT upshift speeds.

The upshift transmission output speed for the lowest non-zero pedal level is selected by determining the transmission output speed that insures that during constant pedal operation, engine speed will not sink below a user specified value after an upshift event. This value, the minimum engine speed after upshift (MESAU) is a parameter the user defines. MESAU is typically 1000 rpm for six and eight cylinder engines, and near 1200 rpm for four cylinder engines. Equation (2) above is used to determine the transmission output speed that corresponds to MESAU engine speed in the next higher gear. Whatever transmission output speed is determined becomes the upshift transmission output speed for the lower gear at that lightest pedal level.

For low and middle pedal boundary levels, an interval of eligible upshift engine speeds is calculated, one interval associated with each upshift event and pedal level. This window of speeds defines the earliest and the latest possible upshift engine speeds just prior to the gear change. For pedal levels at the upper boundary of the light pedal region and the pedal level at the upper reaches of the middle pedal region, and engine speed window of [a,b] is calculated. This interval defines a range of engine speeds that represent candidate targets for engine speed just before that particular upshift event. The upshift event should occur after the engine has reached a speed of a rpm, and before it has reached a speed of b rpm. The left end point a is calculated by insuring the following two criteria are met:

First, assuming pedal is constant and equal to the light pedal boundary value 140 the engine speed after upshift should not be less than MESAU specified by the user.

Second, upshift transmission output speed thresholds should increase or remain constant as pedal is increased. The engine speed a is chosen to insure this. The value a is chosen so that when the engine speed just before upshift is equal to a, the corresponding transmission output speed is higher than lower-pedal upshift transmission output speed thresholds.

The right end point of the engine speed window, b, is calculated by determining the engine speed at which acceleration in the next higher gear is larger than acceleration in the current gear. Acceleration for the current and next gear up at the designated pedal level is estimated, and the acceleration traces as parameterized curves (v(E),a(E)) are determined, where a is vehicle acceleration, v is vehicle velocity, and E is engine speed in units of rpm ranging from to idle to fuel cut-off engine speed. For mid and light pedal values, the acceleration curves in the v-a plane for a given gear and the next highest gear will normally intersect. The lower gear engine speed corresponding to this point of intersection, say $E_0$, defines D:D equals $E_0$.

Suppose a schedule is to be generated for a vehicle that has k gears, where k=4, 5, 6, or 7. Then k−1 upshift speeds must be determined for each pedal level, light and medium. (These points correspond to the k−1 upshift curves that must be derived). Target engine speed values for an upshift event are determined using intervals calculated for upshift events for the given pedal level (either light or medium). Suppose $[a_i,b_i]$ is the engine speed interval associated with the i th upshift curve (associated with the upshift from gear i to gear i+1), i=1, . . . ,k−1. Define A and B as average values for $a_i$ and $b_i$, respectively, so that $$A = \frac{1}{k-1}\sum_{1}^{k-1} a_i \qquad (6)$$

and $$B = \frac{1}{k-1}\sum_{1}^{k-1} b_i \qquad (7)$$

The user defines a weighting parameter between 0 and 1, for use in the calculation of light pedal engine speeds at upshift. Suppose w is the weighting parameter selected. From w, an overall target T is created as a weighted average of A and B:

$$T=(1-w)\cdot A+w\cdot B. \qquad (8)$$

In addition, individual targets $t_i$ are chose for each upshift curve. They are $$t_i = (1-w) \cdot a_i + w \cdot b_i. \quad (9)$$

If the overall target T lies outside an individual interval, then the nearest endpoint to T of the interval is chosen as the target $\tau_i$ for that upshift engine speed target. If T lies inside an individual interval, the target $\tau_i$ is determined from $$\tau_i = T + \min\left(t_i - T, \frac{\varepsilon}{2} \cdot \text{sign}(t_i - T)\right) \quad (10)$$

The parameter $\varepsilon$, like the weighting factor w is a user controlled parameter. It is provided by the user as input to the method of the invention. The larger $\varepsilon$ is, the more target upshift engine speeds can deviate from one another. When the overall target T is inside all upshift intervals, the difference between any two targets can never be more than $\varepsilon$.

Typically, for light pedal upshift speeds, the weighting parameter w is zero or very near zero. This because for light pedal performance, the schedule normally focuses on delivering a smooth driving feel and superior fuel economy, and both of these objectives are best satisfied by lower engine speeds.

Weighting parameters at the middle pedal level are typically larger than zero. This because typically at this pedal level, 3000 rpm upshift engine speeds are desirable, and a nonzero weighting factor is normally required to bump the target up near this speed. Once engine speed targets are identified for upshift events, equation (2) above calculates transmission output speeds corresponding to the identified target engine speeds. The transmission output speed and pedal level define a single breakpoint for the upshift curve of interest.

Downshift curves, such as 2-1, 3-2 and 4-3 of FIGS. 2 and 3 are generated, or built, as follows. Consider a downshift curve that indicates where a downshift from gear x+1 to gear x is to occur, that is the x+1 to x downshift curve. Most of the points for the x+1 to x curve are determined as either horizontal and/or vertical offsets from the corresponding x to x+1 upshift curve of FIG. 1. Reference to the corresponding upshift curve refers to the companion x to x+1 upshift curve.

Each downshift curve is comprised of eight breakpoints of the form $(p_i, s_i)$, with i=1, ..., 8. The point $(s_8, p_8)$ is chosen such that $p_8 = 100\%$, and so that the transmission output speed $s_8$ satisfies two requirements. First, $s_8$ should be to the left of the adjacent upshift curve far enough that the distance along the pedal or y axis between $(s_8, P_8)$ and the nearest point on the adjacent upshift curve is at least (dtent+hyst1) %, where dtent=3/83 which corresponds to 3 degrees of throttle rotation and hyst1=20. The basic intent is to provide some vertical hysteresis such that a minimum pedal travel is required to generate a kick-down event. Second, $s_8$ should be chosen along the speed axis far enough below the WOT upshift point that the vehicle will not kick-down at WOT, and then too soon thereafter upshift again. To avoid this scenario an average wide open throttle torque the engine produces over the final 25% of engine speeds in the data engine input file is estimated. From this WOT engine torque estimate, an average vehicle acceleration in the lower gear is calculated. From this average acceleration in lower gear, an offset is calculated. The offset specifies a minimum distance along the speed axis between upshift and downshift curves. The offset is intended to insure that a minimum of 1.3 seconds elapses when accelerating the vehicle on flat ground from a vehicle speed corresponding to transmission output speed $s_8$ to a vehicle speed corresponding to the WOT upshift transmission output speed.

The seventh breakpoint $(s_7, p_7)$ satisfies the following:

$$s_7 = s_8$$

$$p_7 = 100 - \text{dtent \%}.$$

The sixth breakpoint $(s_6, p_6)$ shares the same pedal coordinate with the seventh breakpoint such that $p_6 = p_7 = 100 - \text{dtent}$ %. The speed coordinate is chosen so that the vertical distance between the sixth point and the corresponding upshift curve is at least a vertical distance of H+hyst1 from the adjacent upshift curve. For example, with reference to FIG. 2, the sixth breakpoint 226 of the 3-2 downshift curve would always be H+hyst1 distance from the 2-3 upshift curve. For transmissions calibrated to date, H has been determined to be either 10 or 15%.

The fifth downshift point shares the same speed coordinate with the sixth point such that $s_5 = s_6$. The vertical distance of $(p_5, s_5)$ to the upshift curve is reduced by H to only hyst1, so that relative to point six, the fifth point moves vertically downward in the shift schedule. This is the vertical side of a "stair-step" curve.

The fourth downshift point shares the same pedal coordinate with the fifth such that $p_4 = p_5$. The speed coordinate is reduced somewhat relative to the fifth point. The reduction in speed coordinate is chosen so that the distance from the upshift curve is slightly bigger than the distance from the fifth point to the upshift curve. The distance becomes larger than hyst2, where hyst2=30% greater than hyst1. The threshold speed coordinate that makes this condition true is calculated as $\bar{s}_4$, and then $s_4$ is chosen to be $\bar{s}_4$, unless $\bar{s}_4$ is greater than $0.9 \cdot s_5$, in which case $s_4 = 0.8 \cdot s_5$. In either case, the vertical hysteresis between upshift and downshift of hyst2 is maintained, because the upshift curve is always sloped upwards toward the upper right corner of the speed versus pedal shift plane of FIG. 2.

The last three points, 206, 204 and 202 of the 2-1 downshift curve form a vertical line in the speed versus pedal plane. Speed $s_3$ is chosen to be that transmission output speed corresponding to the low pedal downshift vehicle speed provided as input by the user. The pedal coordinate for $p_3$ at point 206 of FIG. 2 is set equal to the user selected value for minimum value for 2-1 kick-down. Speed coordinates for points one and two are set equal to $s_3$. Pedal coordinates are $p_2 = p_3/2$ (point 204 of FIG. 2), and $p_1 = 0$ (point 202 of FIG. 2).

For the downshift curve x+1→x, where $x \geq 2, s_3$ (e.g., 220 of FIG. 2) is set equal to the third breakpoint upshift speed coordinate 108 for the x to x+1 upshift curve. This speed coordinate is associated with a light pedal boundary, typically near 20%. The pedal value $p_3$ is chosen to be either 20% larger than the light pedal boundary value, or light pedal percent boundary plus 17%, whichever is larger. The speed coordinates $s_1$ and $s_2$ are set equal to the transmission output speed corresponding to the low pedal downshift vehicle speed indicated by the user. The pedal value $p_1$ (e.g., at point 216 of FIG. 2) is set to zero and $p_2 = p_3/2$.

The invention generates a lock-up schedule, such as shown in FIG. 3, to function in coordination with the up and downshift schedules.

In addition to a lock-up schedule, there are two threshold turbine speeds for each gear to be locked up. These thresholds may be denominated speed 1 and speed 2—one set of these two thresholds for each gear. In a gear for which the torque converter is to lock, the associated speed1 and speed2 thresholds, in conjunction with the lock-up schedule, enable lock-up. The thresholds alone determine the type of lock-up event that will occur—either partial or full lock-up. The turbine speed must exceed speed1 in order for partial lock to occur. When the lock-up schedule indicates a lock event should occur, and the turbine speed is greater than both the full lock-up threshold speed2 and the partial lock-up threshold speed1 for that gear, the converter will fully lock up. In this case, there will be zero or near zero slip.

If speed1 is larger than speed2, then the range of turbine speeds between these two parameters defines where a partial lock-up for that gear will occur. Whenever the turbine speed is larger than speed1 and less than speed2 and a lock-up schedule indicates a lock-up event should occur, the torque converter will partially lock up. The amount of slip allowed during partial lock-up is controlled by a predetermined slip table. The slip table defines a target slip rate that typically becomes smaller as the turbine speed nears speed2. When the turbine speed exceeds speed2, full converter lock-up occurs.

On the other hand, if the full lock-up threshold speed2 is smaller than the partial lock threshold speed1, the vehicle never enters sustained partial lock. Turbine speed must exceed speed1 before any type of lock-up is permitted. In the case where speed1 is greater than speed2, conditions for partial lock-up and full lock-up will be satisfied simultaneously, and hence no sustained partial lock state is maintained.

Data that determines how lock-up schedules are generated are entered by the user. The parameters speed1 and speed2 for each gear for which the torque converter is to lock-up are entered by the user. The user also enters the earliest gear for which lock-up is to occur. Finally, the user can enter a parameter called "delay after upshift to lock". This parameter is specified in units of transmission output speed rpm. Let delta indicate the delay after upshift for a lock-up event. Starting with the earliest gear allowed for lock-up, and continuing through the top gear specified, the method of the invention produces lock-up curves in a three step process. First, a lock-up curve is generated that spans the full pedal range from 0 to 100% that follows the upshift curve except that it is delayed by delta rpm. The pedal levels for the curve are: 0, lightest pedal level, light pedal level, medium pedal level plus 10, or 54 (which ever is larger) and 100%.

Next, this preliminary curve is adjusted by moving the speed coordinates of the first two breakpoints (corresponding to 0 pedal and lightest pedal) to the left below the corresponding upshift curve. This placement insures that 0 pedal lock-up occurs below the upshift curve by a distance that is equal to 10% of the distance from 0 pedal upshift to 0 pedal downshift. To adjust the top of the lock-up curve, the speed coordinate for the 100% pedal value is set equal to the speed coordinate for the next lowest pedal level. Finally, the speed threshold speed1 determines how to truncate the preliminary curve. Since any sort of lock-up event can occur only when turbine speed exceeds speed1, the preliminary lock-up curve is truncated based on the value of speed1. If a vertical line indicating the constant transmission output speed that is equivalent to turbine speed speed1 intersects the preliminary lock-up curve, then the lower pedal part of the preliminary curve is replaced by this vertical line. If the vertical line does not intersect the preliminary curve, then the preliminary curve becomes the final lock-up curve for that gear.

Torque converter unlock curves, or schedules, are generated as follows. Unlock curves are positioned between up and downshift curves. In gear x, the unlock curve is positioned between the x to x+1 upshift curve and the x+1 to x downshift curve. The relative positioning is determined by the user. The default value of 0.2 in testing seems to achieve a good balance between two conflicting objectives: avoiding shift busyness (by not unlocking the torque converter too easily) while at the same time avoiding dead pedal (by unlocking easily enough to allow additional engine torque to be produced before a downshift).

In addition to the parameters speed1 and speed2 described above, there are two additional speed thresholds, speed3 and speed4 that influence unlock events. Typically, speed3 equals speed1 minus delta, where delta is 50 to 300 rpm. Similarly, speed4 is typically 50 to 300 rpm less than speed2. If the vehicle is in a partial fully locked up state when the transmission output speed decreases so that it falls below turbine speed speed2, the converter will partially unlock. If the vehicle is partially locked up and the speed decreases so that turbine speed falls below speed3, then the converter will fully unlock.

Upshift curve refers to a curve in the transmission output speed versus pedal plane where the vehicle is to upshift from gear x to gear x+1. Downshift curve signifies the companion x+1 to x downshift curve. Lock-up curve corresponds to the lock-up curve in gear x+1.

Let z be a parameter value that the user selects. The default value if the user does not provide z, is 0.2. Suppose m is the minimum of the 0 pedal lock-up speed and the 0 pedal upshift speed, and let $s_1$ be the 0 pedal downshift speed. Then the 0 pedal unlock point $u_1$ is initially calculated as $u_1 = m - z \cdot (m - s_1)$.

The corresponding pedal value is 0: $p_1 = 0$. To build the remaining breakpoints, $(u_k, p_k) k=2, \ldots, 6$, the upshift breakpoint which is the "corner" breakpoint is determined. The corner breakpoint is the first breakpoint of the upshift curve that deviates significantly from a vertical line in the speed versus pedal plane. The breakpoint where a significant reduction in slope occurs will be either point 2, 3 or 4. Between this corner point and the downshift curve, a breakpoint for the unlock curve will be placed. To accomplish this, the speed coordinate for the corner breakpoint is made the same as the speed coordinate on the corner upshift breakpoint. A pedal value for this corner breakpoint is selected to be equal to the weighted average of the pedal value for the downshift curve at that speed and the pedal value for the upshift curve at the corner upshift point—i.e., $p_{corner} = z \cdot$downshift pedal at $u_6 + (1-z) \cdot$upshift pedal at $u_6$.

The final breakpoint, point number 6, is always at least 300 rpm below the lock-up curve, and has a pedal coordinate of 100%. The fifth breakpoint always has the same speed coordinate as breakpoint 6, so that $u_5 = u_6$. The pedal value $p_5$ is again a weighted average of the downshift and upshift pedal values with weighting parameter z, such that when $z=1, p_5$ is the downshift pedal point.

The other breakpoints have pedal and speed coordinates that are weighted averages of the upshift and downshift speed point coordinates, such that when $z=1$, these breakpoints lie on the downshift curve, and when $z=0$, they lie on the upshift curve.

The method of the invention assumes a manual throttle vehicle or an electronic throttle vehicle where engine performance does not depend on gear choice.

Figure 6:
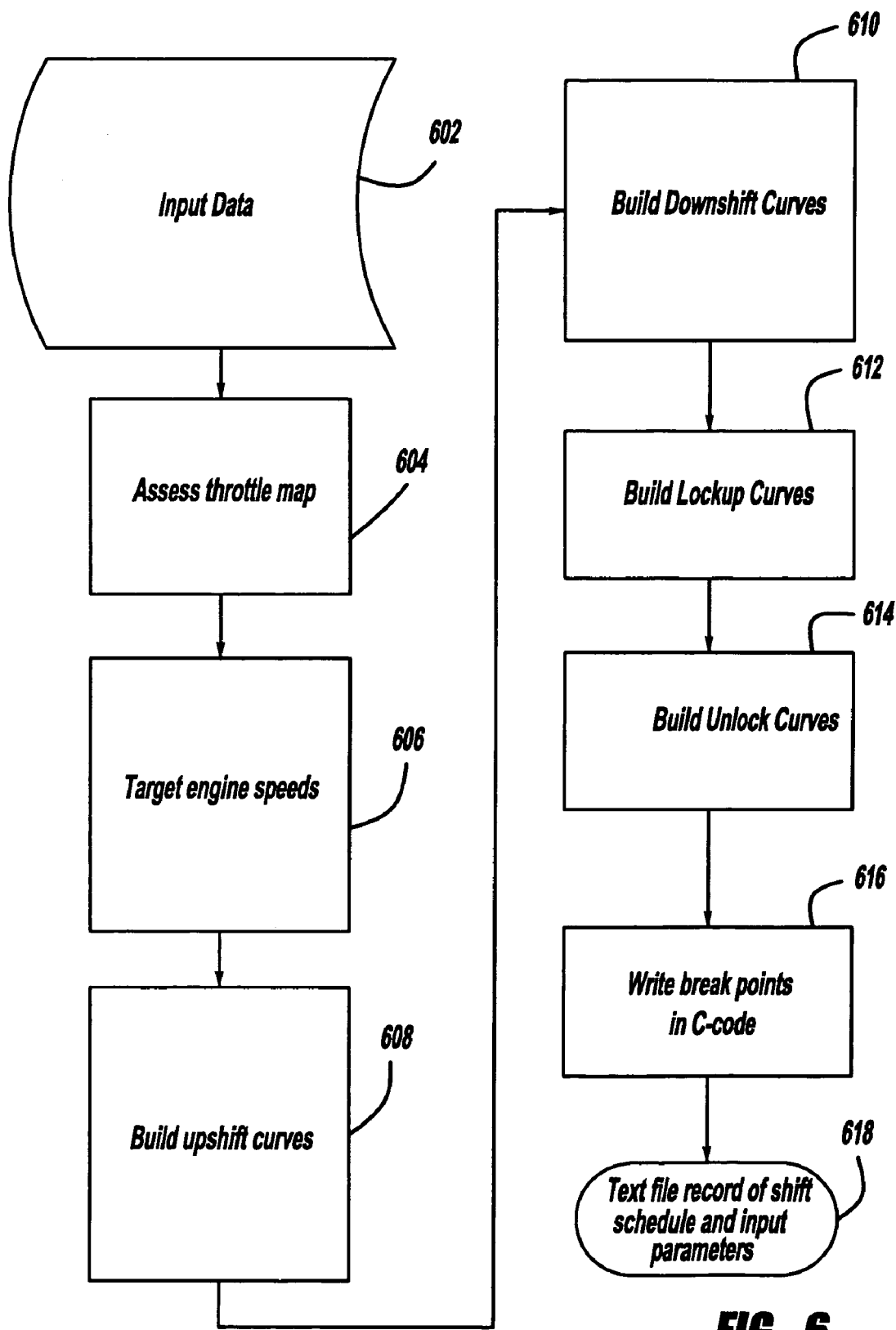
FIG. 6 is a flow chart depicting the major process steps of an exemplary embodiment of the invention.

A computer implemented embodiment of the invention is set forth in the flow chart of FIG. 6. At 602, input data from the engine map, torque converter map, vehicle parameters and drivability or NVH parameters are accumulated for use.

At 604, the throttle map is assessed to determine the lightest throttle from light vehicle loading, light throttle boundary based on torque reserve assessment, and medium throttle boundary based on choked airflow throttle value. This assessment then enables the method to determine the upshift throttle levels.

At 606, target engine speeds before upshifts are determined by calculating a minimum required engine speed for upshift events at low and medium throttle levels and by calculating maximum engine speed for each upshift event for low and medium throttle levels. Additionally, a target engine speed is chosen for upshift events at all throttle levels based on user input and calculated minimum and maximum engine speeds.

At 608, upshift curves are built based on target engine speeds. Converter slip and transmission output speeds for upshifts at light, medium and high throttle levels are calculated. Transmission output speeds are selected such that targeted engine speeds are achieved just before upshift events. The upshift curves are then formed as broken lines connecting points in the throttle/transmission output speed plane, such as shown in FIG. 1.

At 610, the downshift curves are constructed from the upshift curves using throttle and speed offsets. The method calculates speed offset from the corresponding upshift curve for the 100% throttle downshift point. The WOT step is built into the downshift, maintaining throttle offsets. A medium downshift breakpoint insuring minimum throttle offset is then constructed. Finally, light throttle downshifts are selected to pass between adjacent upshift curves and such that coast down requests are honored if possible.

At 612, the method constructs the lock-up curves as offsets from the corresponding upshift curves. The offset is determined by user selected transmission output speed from upshift curves. Lock-up is forced to occur immediately after upshift events for high engine speed operating points.

At 614, the unlock curves are erected for the torque converter. The unlock schedule is between the up and downshift curves to avoid dead pedal. The unlock curve is placed between the corresponding upshift and downshift schedule according to a user indicated tolerance for dead pedal. The unlock curve is truncated according to a user supplied turbine speed threshold.

Finally, at 616, the method generates an electronic control unit binary file that calibrates the transmission shift schedule for the vehicle of interest. Such file may correspond to breakpoints being written in C programming code.

Finally, at 618, the text file record of a shift schedule and input parameters is downloaded to the vehicle's electronic control unit memory.

The invention has been described with reference to an exemplary embodiment for the sake of example only. The scope and spirit of the invention is to be determined from appropriate interpretation of the appended claims.

What is claimed is:

1. A method of calibrating an automatic transmission for a vehicle design comprising:
   acquiring laboratory-generated vehicle engine and transmission data;
   acquiring user-generated drivability data;
   determining upshift throttle levels from acquired laboratory-generated data and from drivability data;
   determining target engine speeds before upshift throttle levels from the laboratory-generated data and the drivability data; and
   generating upshift scheduling curves in a throttle level/transmission output speed plane based upon determined target engine speeds.

2. The method of claim 1 further comprising:
   generating downshift schedule curves from generated upshift scheduling curves by calculating throttle and speed offsets from breakpoints on a corresponding upshift schedule curve, the offsets based on the drivability data.

3. The method of claim 2 further comprising:
   generating torque converter lock-up scheduling curves from generated upshift scheduling curves by selecting transmission output speed offsets from breakpoints on a corresponding upshift scheduling curve, the offsets based on the drivability data.

4. The method of claim 3 further comprising:
   generating torque converter unlock scheduling curves from corresponding generated upshift scheduling curves and downshift scheduling curves by positioning breakpoints of an unlock scheduling curve between breakpoints on corresponding upshift and downshift scheduling curves at positions determined from the drivability data.

5. The method of claim 1 wherein determining upshift throttle levels further comprises:
   using vehicle input data to determine a light throttle boundary and a middle throttle boundary.

6. The method of claim 5 wherein determining target engine speeds before upshifts further comprises:
   calculating minimum and maximum engine speed for each upshift event for throttle levels lower than the light throttle boundary and for throttle levels lying between the light throttle boundary and the middle throttle boundary; and
   selecting a target engine speed for upshift events at all throttle levels based on drivability data and calculated minimum and maximum engine speeds.

7. The method of claim 5 wherein the vehicle input data includes acceleration versus throttle data including a choke point above which throttle increases have substantially no effect on vehicle acceleration and wherein the light throttle boundary comprises a throttle setting generating 25% of available vehicle acceleration, and the middle throttle boundary comprises a throttle setting corresponding to the choke point.

8. The method of claim 2 wherein generating downshift scheduling curves further comprises:
   selecting a speed offset for 100% throttle to insure that a minimum preselected time period elapses when accelerating the vehicle on level terrain from a vehicle speed corresponding to a transmission speed at 100% throttle to a vehicle speed corresponding to a wide open throttle upshift transmission output speed.

9. The method of claim 3 wherein generating torque converter lock-up scheduling curves further comprises:
   selecting first and second threshold turbine speeds for each gear in which the torque converter can lock up, the first and second thresholds determining one of partial and full lockup of the torque converter.

10. The method of claim 4 wherein generating torque converter unlock scheduling curves further comprises:
    positioning breakpoints of the unlock scheduling curve according to a preselected tolerance for dead pedal; and
    truncating the unlock scheduling curve in accordance with preselected turbine speed thresholds.

* * * * *